(12) United States Patent
Patel (10) Patent No.: US 8,738,759 B2
(45) Date of Patent: May 27, 2014

(54) SYSTEM AND METHOD FOR SERVICE RESPONSE MONITORING

(75) Inventor: Rikin S. Patel, Sterling Heights, MI (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 3014 days.

(21) Appl. No.: 10/947,858

(22) Filed: Sep. 23, 2004

(65) Prior Publication Data

US 2006/0064483 A1 Mar. 23, 2006

(51) Int. Cl.
*G06F 15/173* (2006.01)
(52) U.S. Cl.
USPC ............................. 709/224; 709/223; 709/225
(58) Field of Classification Search
USPC .......................................... 709/223, 224, 225
See application file for complete search history.

(56) References Cited

U.S. PATENT DOCUMENTS

| | | | | |
|---|---|---|---|---|
| 6,078,956 | A * | 6/2000 | Bryant et al. | 709/224 |
| 2002/0064149 | A1 * | 5/2002 | Elliott et al. | 370/352 |
| 2002/0083169 | A1 * | 6/2002 | Aki et al. | 709/224 |
| 2002/0120727 | A1 * | 8/2002 | Curley et al. | 709/223 |
| 2003/0023712 | A1 * | 1/2003 | Zhao et al. | 709/223 |
| 2004/0122938 | A1 * | 6/2004 | Messick et al. | 709/224 |
| 2004/0177141 | A1 * | 9/2004 | Foody et al. | 709/224 |

* cited by examiner

Primary Examiner — Umar Cheema

(57) ABSTRACT

A method, system, and computer program product for monitoring the response time for a web service provider is provided. In one embodiment, receiving a web service inbound transaction is received at a web service proxy server. The web service proxy server invokes a response time monitoring service and provides the response time monitoring service with a unique transaction identifier for the inbound transaction. The web service proxy server also invokes, on the web service provider, a web service requested by the inbound transaction. The proxy server later receives an outbound transaction from the web service provider corresponding to the original inbound transaction and invokes the response time monitoring service, once again, providing the unique transaction identifier to the response time monitoring service. The response time monitoring service determines a time for the inbound transaction and for the outbound transaction corresponding to the same unique transaction identifier and sets a response time as the difference in times between the time for the outbound transaction and the time for the inbound transaction.

19 Claims, 6 Drawing Sheets

200
Network

300
Network
Figure 3

SYSTEM AND METHOD FOR SERVICE RESPONSE MONITORING

BACKGROUND OF THE INVENTION

1. Technical Field

The present invention relates generally to computer software and, more particularly, to software for monitoring web services.

2. Description of Related Art

The "Internet" is a worldwide network of computers. Today, the Internet is made up of more than 65 million computers in more than 100 countries covering commercial, academic and government endeavors. Originally developed for the U.S. military, the Internet became widely used for academic and commercial research. Users had access to unpublished data and journals on a huge variety of subjects. Today, the Internet has become commercialized into a worldwide information highway, providing information on every subject known to humankind.

One means of exploiting the Internet that has gained acceptance over the past several years is through the use of Web services. Web services are Web- (or Internet-) based applications that dynamically interact with other Web applications using open standards, such as, for example, Extensible Markup Language (XML), Universal Description, Discovery, and Integration (UDDI), and Simple Object Access Protocol (SOAP). Such applications typically run behind the scenes with one program communicating with another (i.e., server to server). Examples of two major development platforms that support these standards are Microsoft's NET and Sun's Sun ONE (J2EE).

Service Oriented Architectures are gaining acceptance in the industry and are important to businesses, in part, because Web services enable systems in different companies, and applications built using different technologies, to interoperate with each other more easily than before. Web services provide the foundation for building loosely-coupled integration that leads to increased modularity in a complex distributed computing environment. Loose coupling implies that components should know as little as possible about one another, which allows the components to be changed without impacting the other. Loose coupling generally leads both to modularity and asynchrony (i.e., events that are not synchronized or coordinated in time).

As Web services proliferate, so will the scope of managing all interactions from back-end hardware and software systems through to end-user applications and portals. As more business services are offered by an enterprise, measuring the quality of services in terms of their reliability, availability and performance will become critical. Measuring the response time for services and mapping them to the Service Level Agreement will be important to measure the quality of service.

In traditional component based applications such as, for example, EJB Application Response time, Measurement requires invasive code to be inserted at critical points in the code of each web service to measure response time.

Many enterprises require their deployed web services to have the following characteristics:
  Real time response time monitoring
  Integration of the response time monitoring into their existing management environment
  Independence from a single point of failure from Application Response Management (ARM)
  Non-invasive measurement of response time
  Single strategy for monitoring of commercial and custom services.

However, most enterprises do not have a strategy and/or a mechanism to capture service response time and require manual measurement or through network traffic monitoring. For enterprises that are not integrated, tools provide only a fragmented approach without providing a complete solution, since each application or web service requires code to be inserted in order to provide the monitoring services desired by many enterprises. Therefore, it would be desirable to have a application monitoring process that allows an enterprise the ability to seamlessly integrate Custom and COTS Business Web Services; Commercial Web Service Management Platform; Application Response Measurement (ARM) Tools; and Management Console in the Data Center without the need for creating and inserting customized code into each component of the web service offering.

SUMMARY OF THE INVENTION

The present invention provides a method, system, and computer program product for monitoring the response time for a web service provider. In one embodiment, receiving a web service inbound transaction is received at a web service proxy server. The web service proxy server invokes a response time monitoring service and provides the response time monitoring service with a unique transaction identifier for the inbound transaction. The web service proxy server also invokes, on the web service provider, a web service requested by the inbound transaction. The proxy server later receives an outbound transaction from the web service provider corresponding to the original inbound transaction and invokes the response time monitoring service, once again, providing the unique transaction identifier to the response time monitoring service. The response time monitoring service determines a time for the inbound transaction and for the outbound transaction corresponding to the same unique transaction identifier and sets a response time as the difference in times between the time for the outbound transaction and the time for the inbound transaction.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
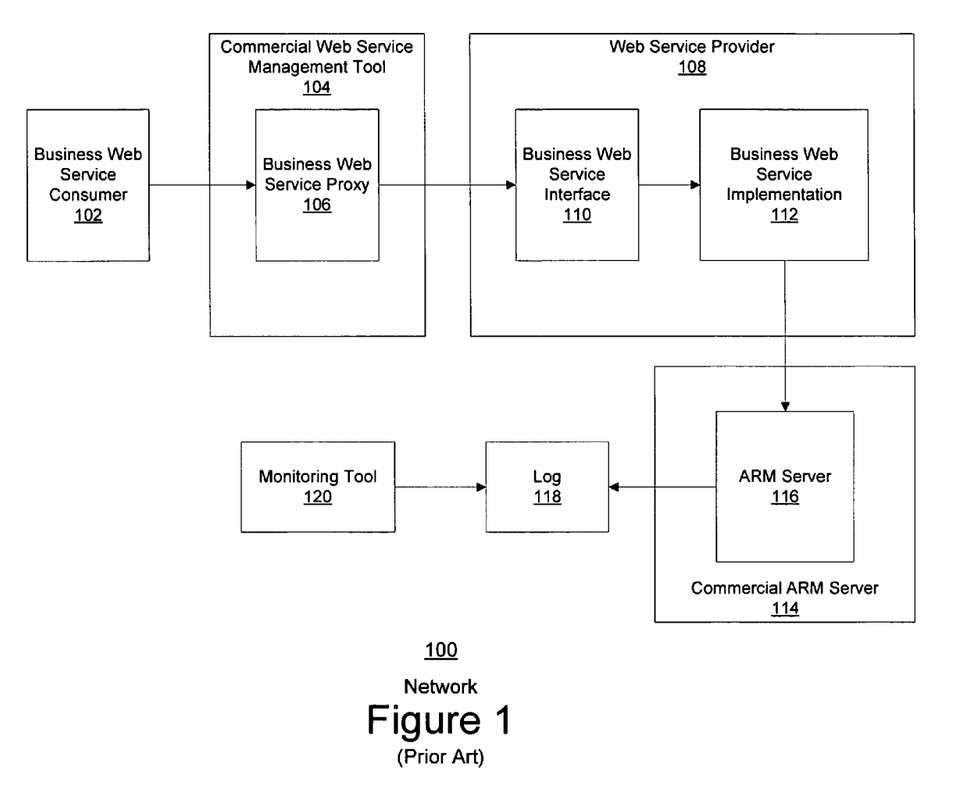
FIG. 1 depicts a block diagram illustrating a high level overview of an application monitoring process in accordance with the prior art.

With reference now to the figures, and in particular with reference to FIG. 1, a block diagram illustrating a high level overview of an application monitoring process for a web service provider is depicted in accordance with the prior art. In the prior art, each service interface 110 has an intermediate proxy 106 used in conjunction with a commercial web service management software 104.

The web proxy server or intermediary proxy 106 is an intermediary between the consumer 102 of the web services (e.g., a user, a web site, a partner) and the provider of the service (e.g., a bank, an airline carrier). The web proxy server 106 is typically a commercial proxy server that intercepts web service invocations for an enterprise and performs add on functions such as, for example, authentication, specialized validations, helps with version management of web services.

An example of a web service is an airline reservation system that allows a consumer to make a reservation for travel on the airline. This web service may be provided by the airline carrier or on behalf of the airline carrier by an IT or IS provider. However, the request for making reservations needs to be monitored for performance and integrated with existing monitoring toolsets such that they can be leveraged with the use of new technology.

Thus, continuing with the description of FIG. 1, a business web service consumer 102 invokes a web service provided by web service provider 108 through a business web service proxy 106 implemented by a commercial (or custom) web service management tool 104. The call to the web service provider 108 is thus forwarded by the business web service proxy 106 to the web service provider 108 through the business web service interface 110. The web service provider 108 includes business web service implementation 112 which performs whatever action is desired and transmits the results back to business web service consumer 102 via business web service interface 110 and business web service proxy 106.

Many web services are provided not by the enterprise desiring the service, but by a third party Information Technology (IT) or Information Service (IS) Provider on behalf of the enterprise. As part of the service level agreement or contract between the IT or IS provider and the enterprise are provisions specifying the response time that should be achieved b y the web service as well as penalties for failing to achieve a certain response time as well as possibly incentives for exceeding a proscribed response time. However, in order to determine whether the response time goals have been met or have not been met, in the prior art, code was written and inserted into each business web service implementation 112 to send response time data, indicating when a request was received and when a result was provided, to a application response management server (ARM) 116 implemented on a commercial ARM server 114. The data was then placed in a log file 118 by the ARM server 116 and could be monitored by a monitoring tool 120 to determine whether the response time goals had been met.

When a single web service implementation 112 was provided, such a solution may be satisfactory. However, when several business web services are provided, the cost and complexity of writing and inserting code into several web services becomes exceedingly high. This is especially true when some of the web services are Commercial from Third party Services (COTS) which require the IT or IS provider to alter code for a software product not produced by the IT or IS provider. Such alterations may result in the COTS software failing to perform as intended or result in a warranty for the COTS product being voided.

The present invention overcomes these obstacles by altering the code in the web service proxy 106 which is utilized by most if not all service oriented architecture designs.

Figure 2:
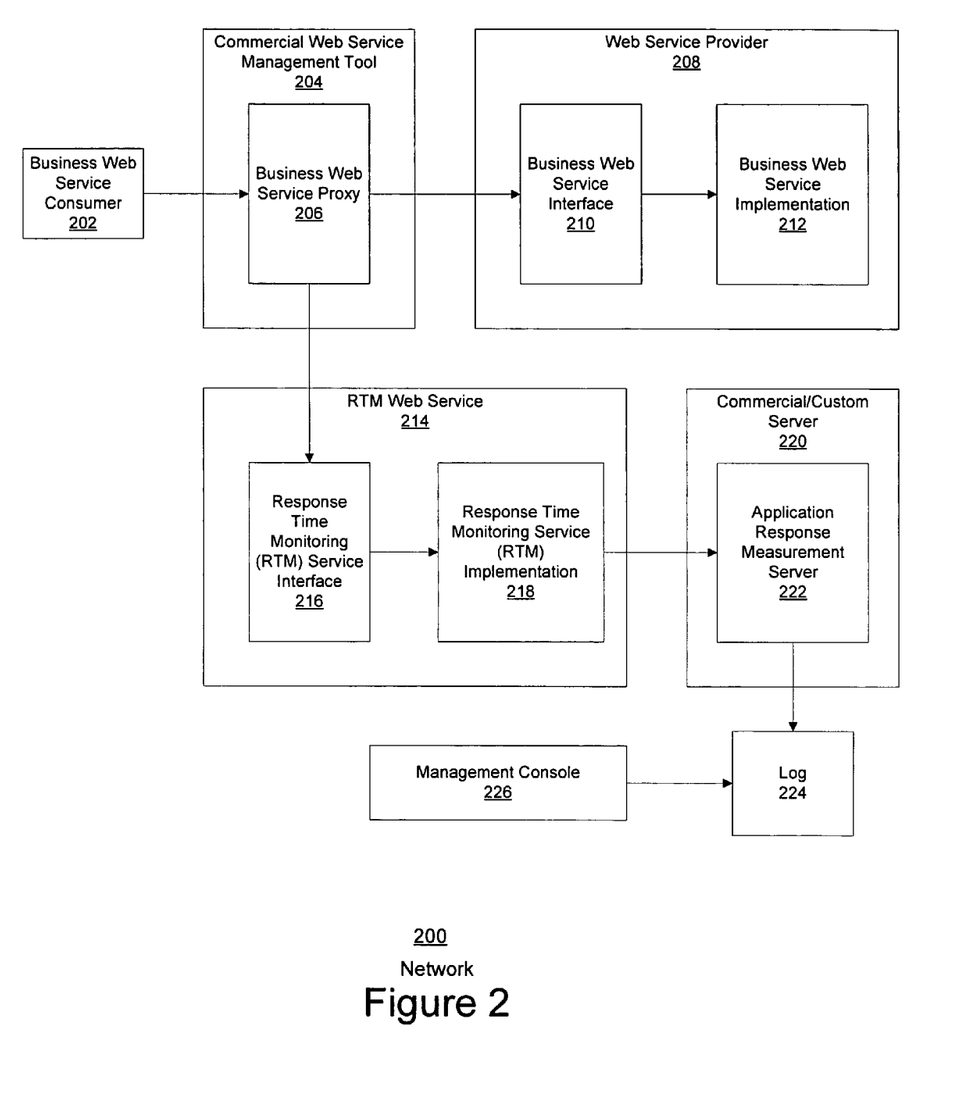
FIG. 2 depicts a block diagram illustrating an application response time monitoring service for a web service in accordance with one embodiment of the present invention.

Thus, referring now to FIG. 2, a block diagram illustrating an application response time monitoring service for a web service is depicted in accordance with one embodiment of the present invention. This service response monitoring process of the present invention is best described in two phases: Design Time and Run Time.

In the Design Time, a business web service interface 210 is defined with its implementation 212 by a web service provider 208. An intermediate business web service proxy 206 for the business service interface 210 is created, deployed and managed by a Web Service Management Platform as a Commercial Web Service Management Tool 204. However, in contrast to the prior art, the business web service implementation 212 is not modified, but rather, the business web service proxy 206 is configured to exit out of calls to it by a business web service consumer 202 to invoke Response Time Measurement (RTM) web service 214 through RTM Service Interface 216. Implementation 218 or the RTM Web Service 214 integrates with a commercial or custom server 220 with an ARM server 222 or other response time measurement server. The ARM server 222 (or other response time server) is configured to log the response time information for the service into a log file 224 and a Management Console 226 (ARM or generic) is configured to scan the log file and, for example, compare the results to a Service Level Agreement (SLA) or notify an administrator if response times differ from a goal or differ from the goal for more than a specified amount of occurrences. The management console 226 may also be tied into a accounting or auditing software to adjust money charges billed to the enterprise by the web service provider 208.

At runtime, the consumer of the business web service 202 will bind to the intermediate proxy 206. The intermediate proxy will utilize the transaction ID or another type of unique identifier for an inbound transaction and binds and invokes the response time measurement service 214. The RTM implementation 218 binds to the ARM server 222 (or other response time measurement server) to initiate the transaction. The intermediate proxy, when it receives the response back from the back end business service interface 210, will utilize the same transaction ID (or other type of unique identifier previously used) for the outbound response to the transaction and again binds and invokes the RTM monitoring service 214. The ARM server 222 (or other response time measurement server) logs the response time information for the service into a log file 224 which may be accessed by the management console 226.

If other web service implementation in addition to business web service implementation 212 are provided, no new response time monitoring code need be written since the business web service proxy 206 will still invoke the RTM web service 214 when a transaction is initiated and again when completed regardless of the particular web service accessed. However, it is possible to reconfigure th4e business web service proxy to indicate which web service a particular transaction accessed if the response time for different web services is allowed to be different. Thus, by implementing a call to the RTM web service from the proxy rather than the web service, cost and complexity of implementing response time monitoring is greatly reduced over that obtained in the prior art.

Although described as a proxy, the present invention may be implemented through the use of any component that is capable of invoking a web service.

Figure 3:
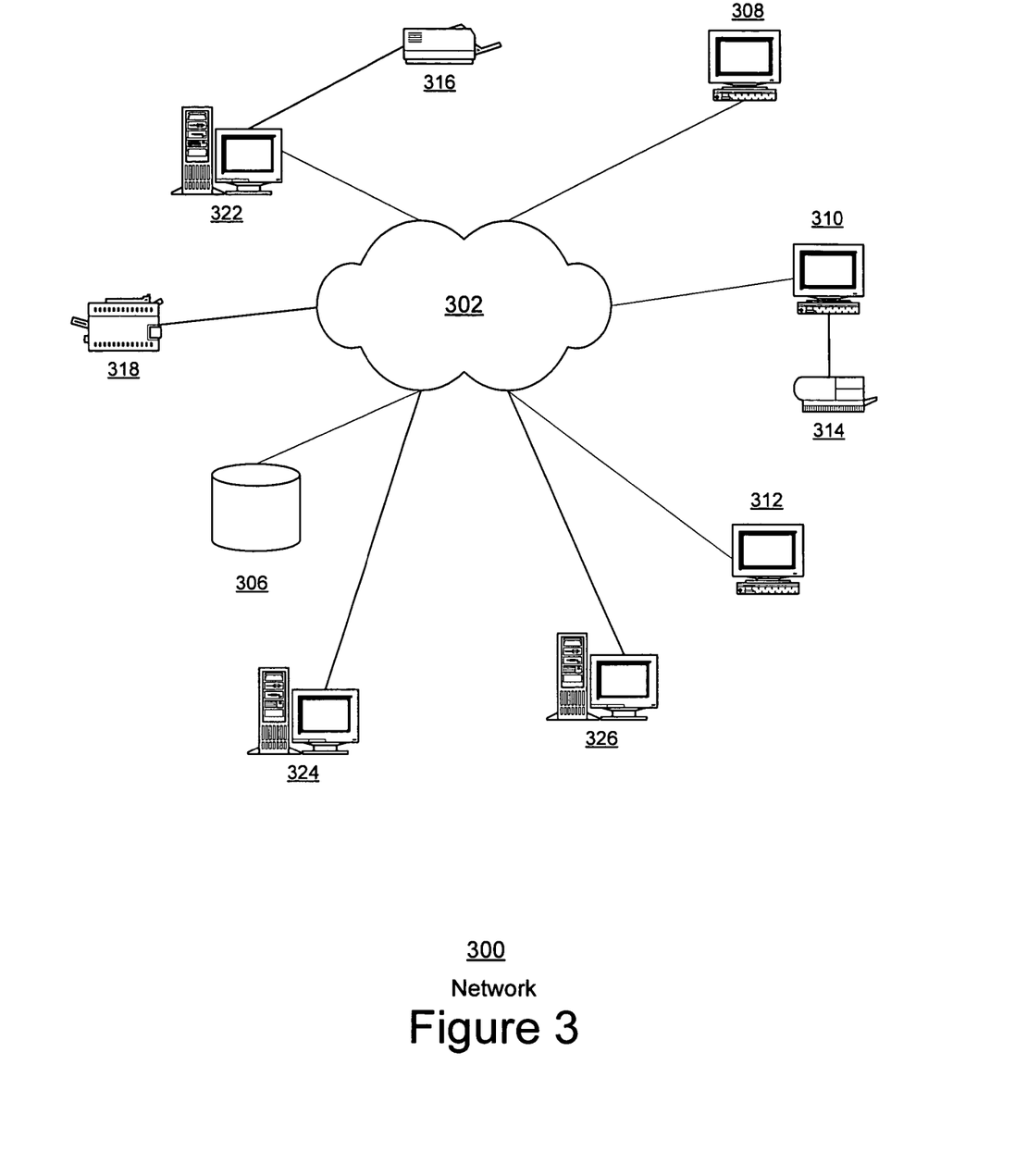
FIG. 3 depicts a pictorial representation of a distributed data processing system in which the present invention may be implemented.

With reference now to FIG. 3, a pictorial representation of a distributed data processing system is depicted in which the present invention may be implemented.

Distributed data processing system 300 is a network of computers in which the present invention may be implemented. Distributed data processing system 300 contains network 302, which is the medium used to provide communications links between various devices and computers connected within distributed data processing system 300. Network 302 may include permanent connections, such as wire or fiber optic cables, or temporary connections made through telephone connections.

In the depicted example, servers 322-326 are connected to network 302, along with storage unit 306. In addition, clients 308, 310 and 312 are also connected to network 302. These clients, 308, 310 and 312, may be, for example, personal computers or network computers. In the depicted example, server 322 acts as a proxy server for a web service provided by server 324. Server 326 is a business web service consumer. Clients 308 and 312 may be clients to server 324 while client 310 may be implemented as a management console allowing, for example, a administrator to monitor response time for web services administered by server 324. Distributed data processing system 300 may include additional servers, clients, and other devices not shown.

Distributed data processing system 300 also includes printers 314, 316 and 318. A client, such as client 310, may print directly to printer 314. Clients such as client 308 and client 312 do not have directly attached printers. These clients may print to printer 316, which is attached to server 304, or to printer 318, which is a network printer that does not require connection to a computer for printing documents. Client 310, alternatively, may print to printer 316 or printer 318, depending on the printer type and the document requirements. Printers 314-318 may allow an administrator to print out reports or other data related to response time management.

In the depicted example, distributed data processing system 300 is the Internet, with network 302 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages. Of course, distributed data processing system 300 also may be implemented as a number of different types of networks such as, for example, an intranet or a local area network.

FIG. 3 is intended as an example and not as an architectural limitation for the processes of the present invention.

Figure 4:
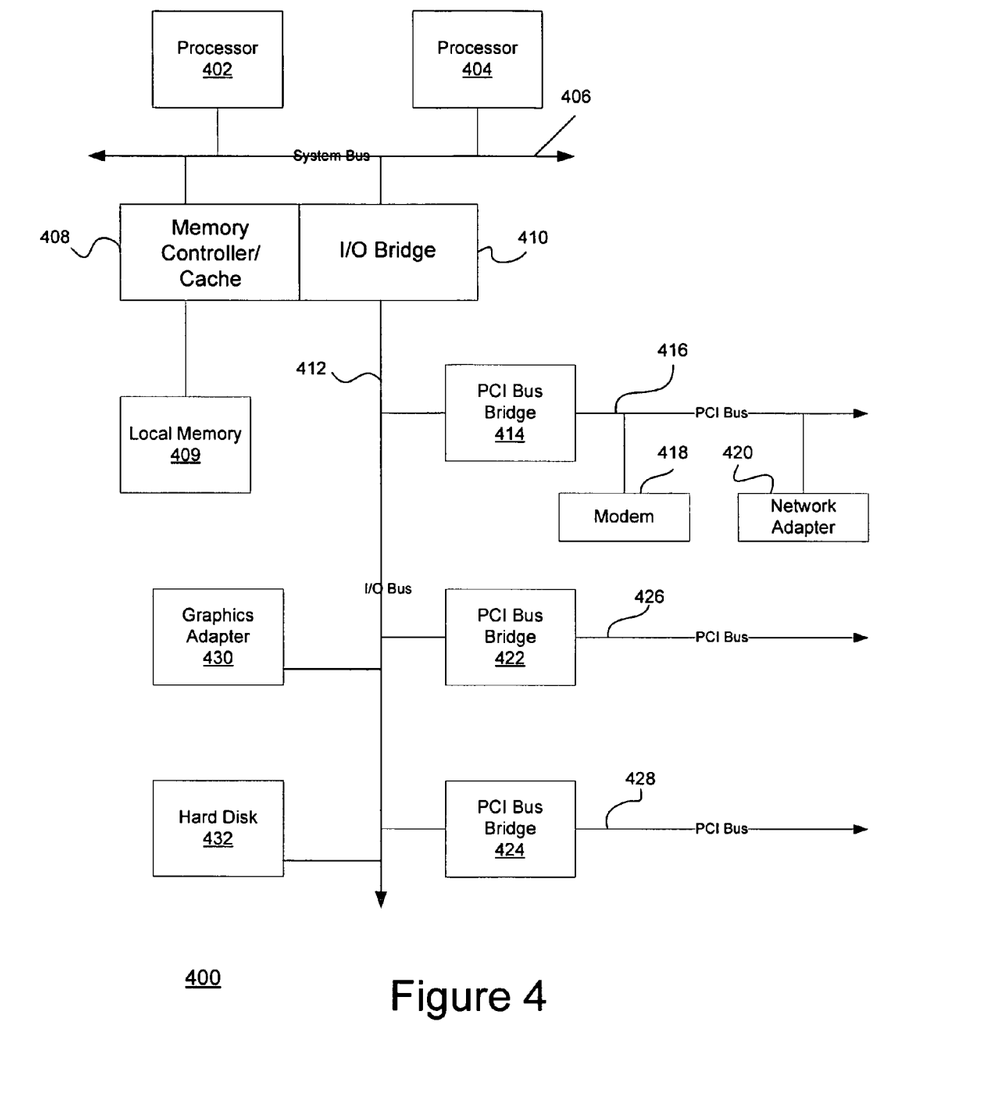
FIG. 4 depicts a diagram of a data processing system which may be implemented as a server in accordance with the present invention.

Referring to FIG. 4, a block diagram of a data processing system which may be implemented as a server, such as any of servers 322-326 in FIG. 3, is depicted in accordance with the present invention. Data processing system 400 may be a symmetric multiprocessor (SMP) system including a plurality of processors 402 and 404 connected to system bus 406. Alternatively, a single processor system may be employed. Also connected to system bus 406 is memory controller/cache 408, which provides an interface to local memory 409. I/O bus bridge 410 is connected to system bus 406 and provides an interface to I/O bus 412. Memory controller/cache 408 and I/O bus bridge 410 may be integrated as depicted.

Peripheral component interconnect (PCI) bus bridge 414 connected to I/O bus 412 provides an interface to PCI local bus 416. A number of modems 418-220 may be connected to PCI bus 416. Typical PCI bus implementations will support four PCI expansion slots or add-in connectors. Communications links to network computers 308-312 in FIG. 3 may be provided through modem 418 and network adapter 420 connected to PCI local bus 416 through add-in boards.

Additional PCI bus bridges 422 and 424 provide interfaces for additional PCI buses 426 and 428, from which additional modems or network adapters may be supported. In this manner, server 400 allows connections to multiple network computers. A memory mapped graphics adapter 430 and hard disk 432 may also be connected to I/O bus 412 as depicted, either directly or indirectly.

Those of ordinary skill in the art will appreciate that the hardware depicted in FIG. 4 may vary. For example, other peripheral devices, such as optical disk drives and the like, also may be used in addition to or in place of the hardware depicted. The depicted example is not meant to imply architectural limitations with respect to the present invention.

Data processing system 400 may be implemented as, for example, an AlphaServer GS1280 running a UNIX® operating system. AlphaServer GS1280 is a product of Hewlett-Packard Company of Palo Alto, Calif. "AlphaServer" is a trademark of Hewlett-Packard Company. "UNIX" is a registered trademark of The Open Group in the United States and other countries.

Figure 5:
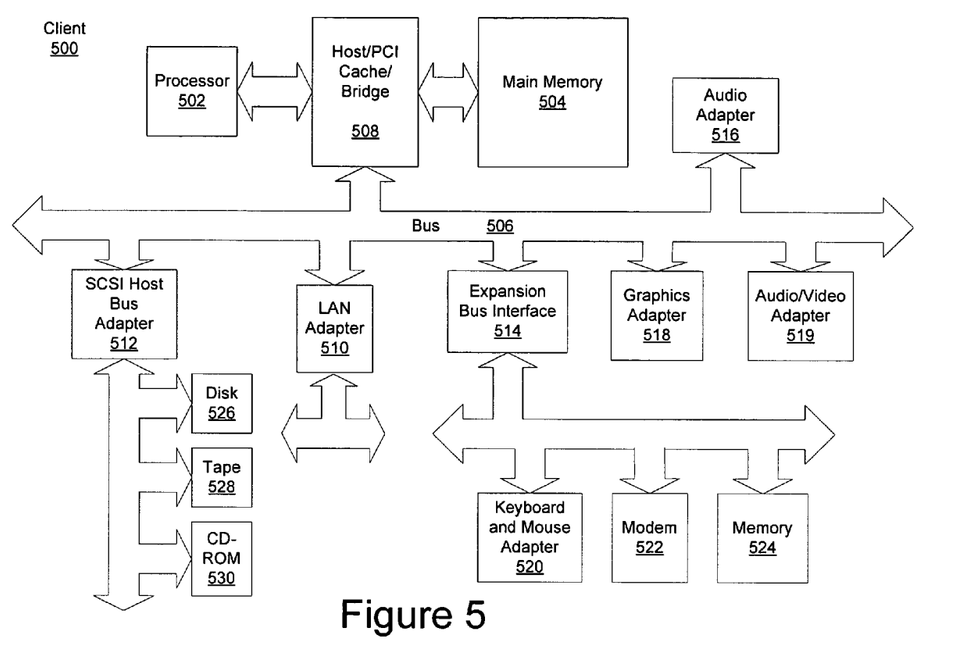
FIG. 5 depicts a block diagram of a data processing system in which the present invention may be implemented.

With reference now to FIG. 5, a block diagram of a data processing system in which the present invention may be implemented is illustrated. Data processing system 500 is an example of a client computer. Data processing system 500 employs a peripheral component interconnect (PCI) local bus architecture. Although the depicted example employs a PCI bus, other bus architectures, such as Micro Channel and ISA, may be used. Processor 502 and main memory 504 are connected to PCI local bus 506 through PCI bridge 508. PCI bridge 508 may also include an integrated memory controller and cache memory for processor 502. Additional connections to PCI local bus 506 may be made through direct component interconnection or through add-in boards. In the depicted example, local area network (LAN) adapter 510, SCSI host bus adapter 512, and expansion bus interface 514 are connected to PCI local bus 506 by direct component connection. In contrast, audio adapter 516, graphics adapter 518, and audio/video adapter (A/V) 519 are connected to PCI local bus 506 by add-in boards inserted into expansion slots. Expansion bus interface 514 provides a connection for a keyboard and mouse adapter 520, modem 522, and additional memory 524. In the depicted example, SCSI host bus adapter 512 provides a connection for hard disk drive 526, tape drive 528, CD-ROM drive 530, and digital video disc read only memory drive (DVD-ROM) 532. Typical PCI local bus implementations will support three or four PCI expansion slots or add-in connectors.

An operating system runs on processor 502 and is used to coordinate and provide control of various components within data processing system 500 in FIG. 5. The operating system may be a commercially available operating system, such as Windows XP, which is available from Microsoft Corporation of Redmond, Wash. "Windows XP" is a trademark of Microsoft Corporation. An object oriented programming system, such as Java, may run in conjunction with the operating system, providing calls to the operating system from Java programs or applications executing on data processing system 500. Instructions for the operating system, the object-oriented operating system, and applications or programs are located on a storage device, such as hard disk drive 526, and may be loaded into main memory 504 for execution by processor 502.

Those of ordinary skill in the art will appreciate that the hardware in FIG. 5 may vary depending on the implementation. For example, other peripheral devices, such as optical disk drives and the like, may be used in addition to or in place of the hardware depicted in FIG. 5. The depicted example is not meant to imply architectural limitations with respect to the present invention. For example, the processes of the present invention may be applied to multiprocessor data processing systems.

Figure 6:
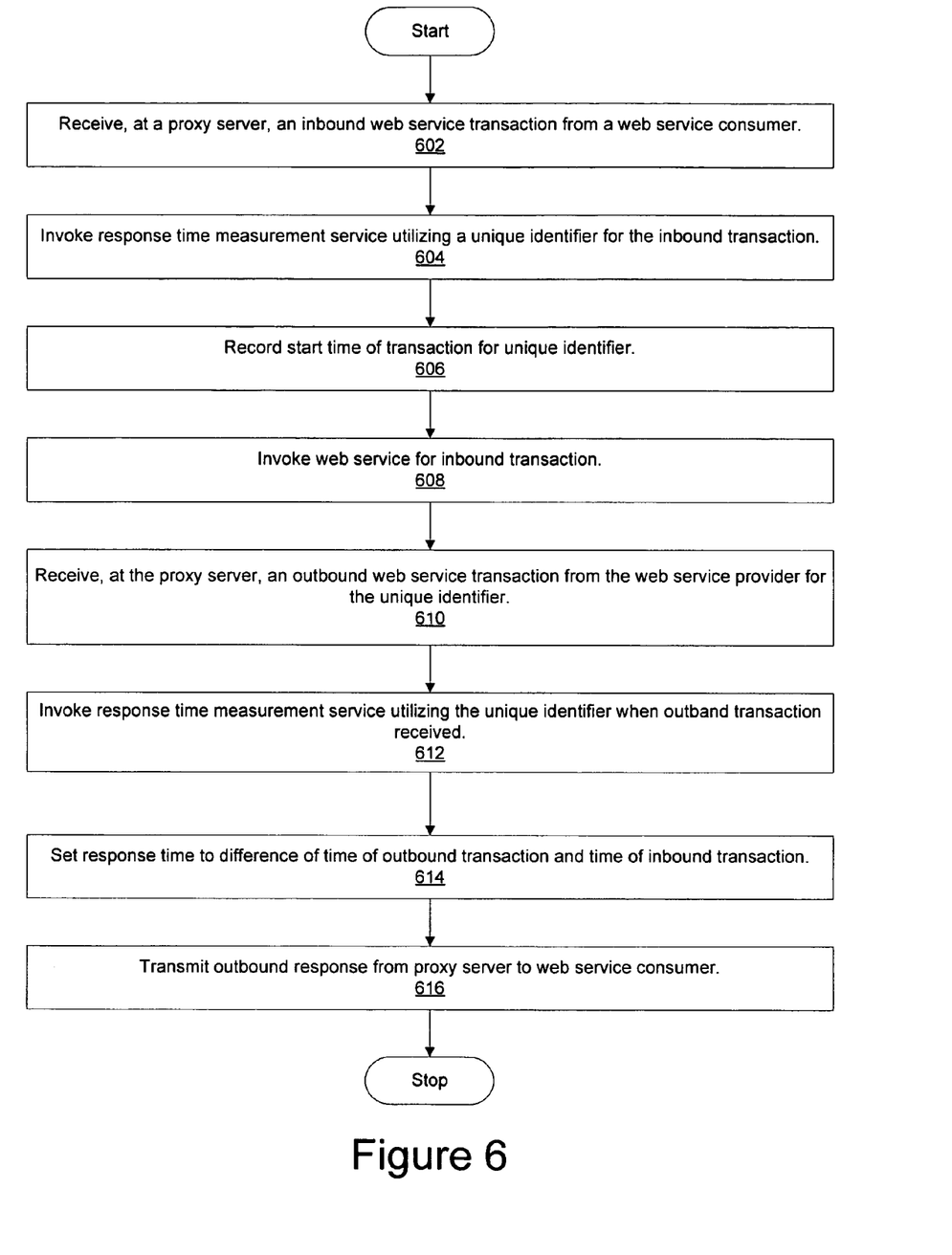
FIG. 6 depicts a diagram illustrating an exemplary process flow and program function for a response time management process in accordance with one embodiment of the present invention.

With reference now to FIG. 6, a diagram illustrating an exemplary process flow and program function for a response time management process is depicted in accordance with one embodiment of the present invention. A proxy server receives an inbound web service transaction from a web service consumer (step 602). The proxy server invokes a response time measurement service utilizing a unique identifier associated with the inbound transaction (step 604). The response time measurement service records the time for the inbound transaction (step 606). The proxy server also invokes the web service for the inbound transaction (step 608).

Once the web service provider has processed the inbound transaction, it sends an outbound transaction back to the proxy server which then receives the outbound transaction (step 610). The proxy server, upon receiving the outbound transaction, invokes the response time measurement service once again utilizing the unique identifier (step 612). The response time measurement service, either itself or through the use of other services, such as, for example, an application response measurement server, sets the response time to the different of the time of the outbound transaction and the time of the inbound transaction for the same unique transaction identifier and records this to a log file (step 614). The proxy server, after, prior to, or simultaneously with invoking the response time measurement server, transmits the outbound response to the originating web service consumer (step 616).

In one embodiment of the response time monitoring service process of the present invention, a proxy server receives a web service inbound transaction, invokes a response time monitoring service, and provides the response time monitoring service with a unique transaction identifier for the inbound transaction. The proxy service also invokes, on the web service provider, a web service requested by the inbound transaction. Once the web service provider has processed the inbound transaction, the proxy server receives the outbound transaction from the web service provider corresponding to the inbound transaction, invokes the response time monitoring service, and provides the unique transaction identifier to the response time monitoring service. The response time monitoring service determines a time for the inbound transaction and for the outbound transaction corresponding to the same unique transaction identifier and sets a response time as the difference in times between the time for the outbound transaction and the time for the inbound transaction.

The response time is then recorded in a log file. A management console may monitor response times recorded in the log file and determine whether the response times are in accord with requirements of a service level agreement. The management console or other component may also, in response to a determination that a percentage of response times that exceed a response time specified in a service level agreement is greater than a threshold value, alert an administrator in order to allow the administrator to take corrective action to improve the web service response time. Charges billed to an enterprise by a web service provider may also be adjusted based on a comparison of actual response times with a formula for determining billing charges.

In another embodiment, the response time monitoring service comprises a web service proxy server, a web service provider, and a response time monitoring service. The web service proxy server receives a web service inbound transaction having a unique transaction identifier from a web service consumer, invokes the response time monitoring service, and invokes the web service requested by the web service inbound transaction. The web service proxy server also receives a web service outbound transaction corresponding to the unique transaction identifier, invokes the response time monitoring service; and transmits the web service outbound transaction to the web service consumer. The response time monitoring service determines a response time for the web service transaction based upon a time associated with the proxy server receiving the web service inbound transaction and the time associated with the proxy server receiving the web service outbound transaction. The web service provider provides a web service to the web service consumer.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for monitoring the response time for a web service provider, the method comprising:
    receiving a web service inbound transaction at a proxy;
    exiting from calls for inbound transactions to invoke a response time monitoring service from the proxy in response to the inbound transaction reception and providing the response time monitoring service with a unique transaction identifier for the inbound transaction;
    invoking on the web service provider a web service requested by the inbound transaction;
    receiving an outbound transaction in response to the requested web service from the web service provider at the proxy;
    invoking the response time monitoring service from the proxy in response to the outbound transaction reception and providing the unique transaction identifier to the response time monitoring service;
    determining a time for the inbound transaction and for the outbound transaction corresponding to the same unique transaction identifier;
    setting a response time as the difference in times between a time for the outbound transaction and a time for the inbound transaction.

2. The method as recited in claim 1, further comprising: recording the response time in a log file.

3. The method as recited in claim 2, wherein the log file comprises a plurality of response times and further comprising:
monitoring response times recorded in the log file and determining whether the response times are in accord with requirements of a service level agreement.

4. The method as recited in claim 2, further comprising:
responsive to a determination that a percentage of response times that exceed a response time specified in a service level agreement is greater than a threshold value, alerting an administrator.

5. The method as recited in claim 1, further comprising: adjusting charges billed to an enterprise by a web service provider based on a comparison of actual response times with a formula for determining billing charges.

6. A computer program product stored in a non-transitory computer readable media for use in a data processing system for monitoring the response time for a web service provider, the computer program product comprising:
first instructions for receiving a web service inbound transaction at a proxy;
second instructions for exiting from calls for inbound transactions to invoke a response time monitoring service from the proxy in response to the reception of the inbound transaction and providing the response time monitoring service with a unique transaction identifier for the inbound transaction;
third instructions for invoking on the web service provider a web service requested by the inbound transaction;
fourth instructions for receiving an outbound transaction in response to the requested web service at the proxy from the web service provider;
fifth instructions for invoking the response time monitoring service from the proxy in response to the reception of the outbound transaction and providing the unique transaction identifier to the response time monitoring service;
sixth instructions for determining a time for the inbound transaction and for the outbound transaction corresponding to the same unique transaction identifier;
seventh instructions for setting a response time as the difference in times between a time for the outbound transaction and a time for the inbound transaction.

7. The computer program product as recited in claim 6, further comprising:
eighth instructions for recording the response time in a log file.

8. The computer program product as recited in claim 7, wherein the log file comprises a plurality of response times and further comprising: ninth instructions for monitoring response times recorded in the log file and determining whether the response times are in accord with requirements of a service level agreement.

9. The computer program product as recited in claim 7, further comprising: ninth instructions for alerting an administrator in response to a determination that a percentage of response times that exceed a response time specified in a service level agreement is greater than a threshold value.

10. The computer program product as recited in claim 6, further comprising:
eighth instructions for adjusting charges billed to an enterprise by a web service provider based on a comparison of actual response times with a formula for determining billing charges.

11. A data processing system comprising:
a memory to store instructions for monitoring the response time for a web service provider;
a processor to execute the instructions to:
receive a web service inbound transaction at a proxy;
exit from calls for inbound transactions to invoke a response time monitoring service from the proxy in response to the inbound transaction reception and providing the response time monitoring service with a unique transaction identifier for the inbound transaction;
toinvoke on the web service provider a web service requested by the inbound transaction;
receive an outbound transaction in response to the requested web service at the proxy from the web service provider;
invoke the response time monitoring service monitoring service from the proxy in response to the outbound transaction reception and providing the unique transaction identifier to the response time monitoring service;
determine a time for the inbound transaction and for the outbound transaction corresponding to the same unique transaction identifier;
set a response time as the difference in times between a time for the outbound transaction and a time for the inbound transaction.

12. The data processing system as recited in claim 11, the processor to execute the instructions to record the response time in a log file.

13. The data processing system as recited in claim 12, wherein the log file comprises a plurality of response times and further comprising: ninth means for monitoring response times recorded in the log file and determining whether the response times are in accord with requirements of a service level agreement.

14. The data processing system as recited in claim 12, the processor to execute the instructions to alert an administrator in response to a determination that a percentage of response times that exceed a response time specified in a service level agreement is greater than a threshold value.

15. The data processing system as recited in claim 11, the processor to execute the instructions to adjust charges billed to an enterprise by a web service provider based on a comparison of actual response times with a formula for determining billing charges.

16. A web service system, comprising:
a web service proxy server coupled to a web service provider along a first logical path and coupled to a web service consumer; and
a response time monitoring web service coupled to the web service proxy server along a second logical path parallel to the first logical path;
wherein the web service proxy server receives a web service inbound transaction from the web service consumer, associates a unique transaction identifier with the inbound transaction, invokes the response time monitoring web service along the second logical path, and invokes a web service from the web service provider requested by the web service inbound transaction along the first logical path;
wherein the web service proxy server receives a web service outbound transaction in response to the web service inbound transaction and corresponding to the unique transaction identifier from the web service provider along the first logical path, invokes the response time monitoring web service along the second logical path and in response to the web service outbound transaction; and transmits the web service outbound transaction to the web service consumer;

wherein the response time monitoring web service determines a response time for the web service transaction based upon a time associated with the proxy server receiving the web service inbound transaction and the time associated with the proxy server receiving the web service outbound transaction with the corresponding unique transaction identifier; and wherein the web service provider provides a web service to the web service consumer.

17. The web system as recited in claim 16, further comprising: an application response measurement server coupled to the response time monitoring web service; and a log file coupled to the application response measurement server; wherein the application response measurement server receives a response time for a transaction from the response time monitoring web service and records the response time in the log file.

18. The web system as recited in claim 17, further comprising: a management console coupled to and monitoring response times recorded in the log file.

19. The method as recited in claim 1 wherein the response time monitoring service is on a first communication path and the web service requested by the inbound transaction along a second communication path parallel to the first communication path.

* * * * *

UNITED STATES PATENT AND TRADEMARK OFFICE
CERTIFICATE OF CORRECTION

PATENT NO.      : 8,738,759 B2
APPLICATION NO. : 10/947858
DATED           : May 27, 2014
INVENTOR(S)     : Rikin S. Patel Page 1 of 1

It is certified that error appears in the above-identified patent and that said Letters Patent is hereby corrected as shown below:

In the claims

In column 10, line 12, in Claim 11, delete "toinvoke" and insert -- to invoke --, therefor.

In column 10, line 17, in Claim 11, delete "monitoring service monitoring service" and insert -- monitoring service --, therefor.

Signed and Sealed this
Sixth Day of October, 2015

Michelle K. Lee
*Director of the United States Patent and Trademark Office*